March 13, 1956     W. F. SPANG     2,737,684
MEAT TREATING MECHANISM
Filed July 26, 1954

*INVENTOR.*
WILLIAM F. SPANG
BY
*Kenway, Jenney, Witter & Hildreth*
ATTORNEYS

United States Patent Office 2,737,684
Patented Mar. 13, 1956

2,737,684
MEAT TREATING MECHANISM

William F. Spang, Medfield, Mass., assignor to Needham Manufacturing Company Inc., Needham Heights, Mass., a corporation of Massachusetts Application July 26, 1954, Serial No. 445,715

7 Claims. (Cl. 17—26)

This invention relates to machines for tenderizing meat by cutting or slitting the meat as it is passed through and between a pair of cylindrical gang cutters embodying slitting disks that penetrate and cut the meat along parallel lines at either or both faces. The machine is used to tenderize steaks and the like.

It has been found that the tenderizing of certain meats is facilitated by freezing the meat before passing it through the machine but such freezing so hardens the meat that the tenderizing knives of present machines tend to pass over and "bobble" the meat on the blades instead of penetrating the meat and drawing it into the machine. The primary object of my invention resides in the employment of additional pointed blades associated with the knives and disposed to penetrate into the meat and draw it into the machine between the opposed and cooperating cutters.

Figure 1:
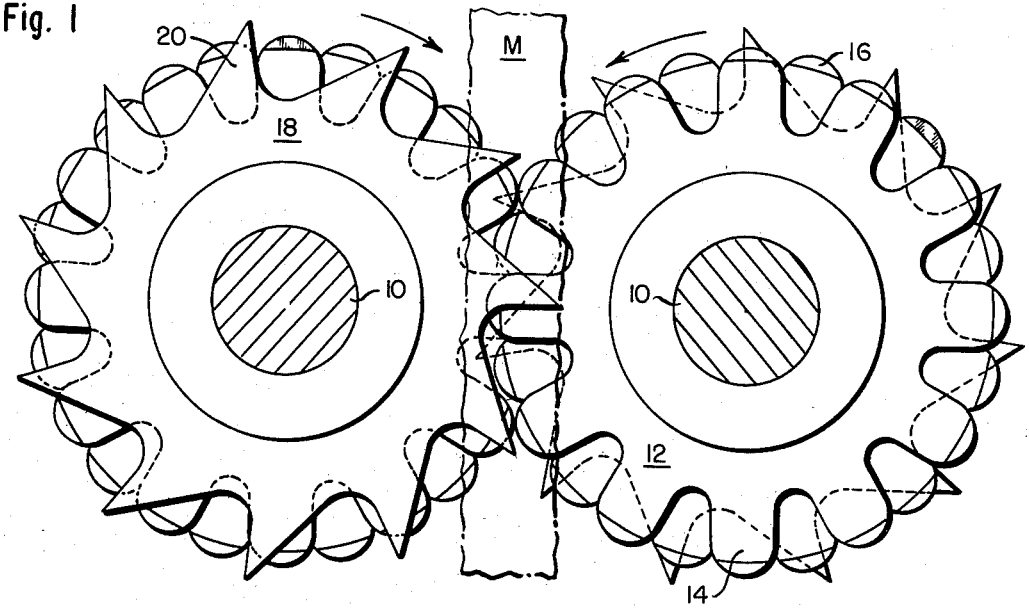
Figure 2:
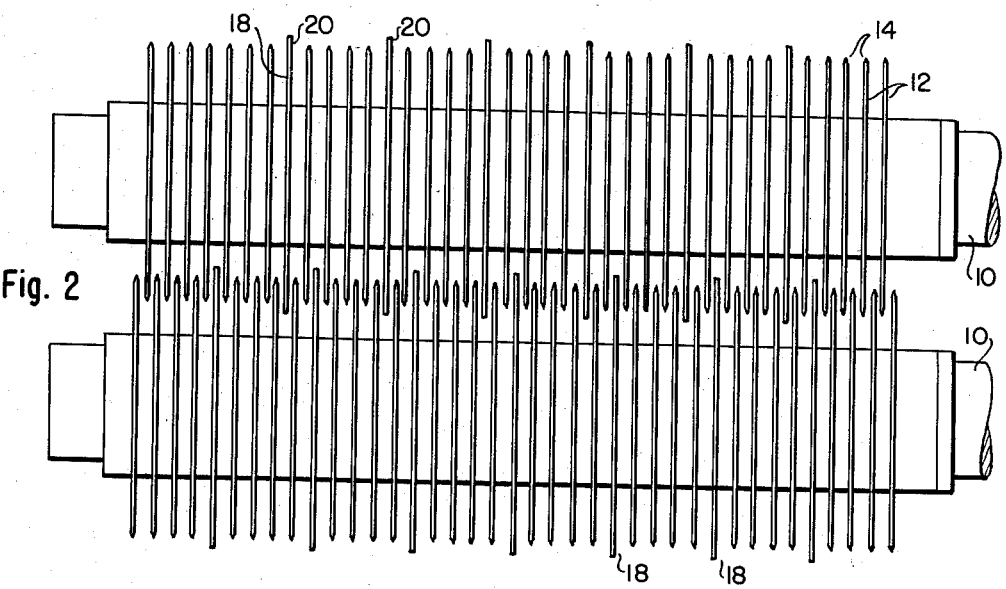
Figure 3:
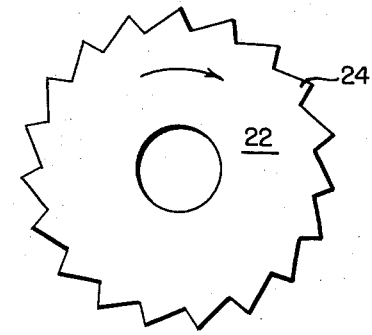

These and other features of the invention will be best understood and appreciated from the following description of preferred embodiments thereof selected for purposes of illustration and shown in the accompanying drawing in which:

Fig. 1 is an enlarged cross sectional view through a pair of cylindrical gang cutters embodying the invention, Fig. 2 is a plan view of the cutters on a reduced scale, and Fig. 3 is an elevation of a modified form of meat feeding disk employed in the cutters.

In the drawing 10 indicates a pair of relatively adjacent and parallel shafts having a plurality of meat treating disks fixed to and in spaced relation on and along the shafts with the disks on each shaft alternately disposed between and overlapping the disks on the other shaft at their peripheries. The disks 12 are of a type commonly employed in meat tenderizing machines embodying relatively broad and outwardly projecting meat slitting blades 14 with sharpened edges 16 at the periphery of the disk. These blades are adapted to penetrate the meat M as it passes between the cutters and form discontinuous tenderizing slits or cuts thereinto at both faces.

When operating on frozen meat it has been found that the blades tend to ride over instead of penetrating into the meat with the result that the meat "bobbles" and bounces on the blades instead of passing through the machine. My invention contemplates the employment of additional pointed blades carried by the shafts for penetrating the meat and drawing it into the machine.

As illustrated in Figs. 1 and 2, I intersperse additional meat feeding disks 18 having pointed blades 20 among the meat slitting disks 12, the blades 20 being so disposed that they will penetrate the meat in opposed relation at both faces and draw it downwardly through the cutters during which the blades 14 make discontinuous tenderizing cuts in the meat. The points of the blades 20 preferably extend outwardly beyond the blades 14 so that they readily engage and penetrate the frozen meat. While in Fig. 2 I have illustrated each disk 18 as disposed between groups of disks 12 it will be understood that the disks will be given such arrangement as is found best for the function to be performed.

The disk 22 illustrated in Fig. 3 is provided with pointed meat penetrating blades 24 that are more obtuse than the blades 20 and it will be understood that such blades will be employed as seem best to perform the intended function.

Having thus disclosed my invention what I claim as new and desire to secure by Letters Patent is—

1. A cylindrical gang cutter for tenderizing meat, comprising a shaft and a plurality of meat treating disks fixed to and in spaced relation on and along the shaft, certain of the disks having outwardly projecting meat slitting edges at and around their peripheries for cutting slits in the meat and other of the disks being interspersed between groups of said certain disks and having pointed blades extending outwardly beyond said edges for penetrating and feeding the meat upon rotation of the shaft.

2. A cylindrical gang cutter for tenderizing meat, comprising a shaft and a plurality of meat treating disks fixed to and in spaced relation on and along the shaft, the disks having outwardly extending meat penetrating blades disposed in spaced relation at and around their peripheries and including relatively spaced and broad blades for cutting discontinuous slits in the meat and relatively pointed blades interspersed among the broad blades for penetrating and feeding the meat upon rotation of the shaft.

3. The gang cutter defined in claim 2 in which the pointed blades extend outwardly beyond the broad blades.

4. A cylindrical gang cutter for tendering meat comprising a shaft, a plurality of meat slitting disks fixed to and in spaced relation on and along the shaft and a plurality of meat feeding disks fixed to the shaft each between two groups of slitting disks, each slitting disk having relatively broad and outwardly projecting meat slitting blades disposed in spaced relation at and around its periphery and each feeding disk having in spaced relation at and around its periphery meat feeding blades provided with pointed ends for penetrating and feeding the meat upon rotation of the shaft.

5. The gang cutter defined in claim 4 in which the pointed blades extend outwardly beyond the broad blades.

6. Meat treating mechanism comprising a pair of relatively adjacent and parallel shafts, a plurality of meat engaging and treating disks fixed to and in spaced relation on and along the shafts and with the disks on each shaft alternately disposed between and overlapping the disk on the other shaft at their peripheries, the disks having outwardly extending meat penetrating blades disposed in spaced relation at and around their peripheries and including relatively broad blades for cutting discontinuous slits in the meat and relatively pointed blades interspersed among the broad blades for penetrating and feeding the meat upon rotation of the shafts.

7. Meat treating mechanism comprising a pair of relatively adjacent and parallel shafts, a plurality of meat slitting disks fixed to and in spaced relation on and along each shaft with the disks on each shaft alternately disposed between and overlapping the disks on the other shaft at their peripheries, and a plurality of meat feeding disks fixed to each shaft each between two groups of said slitting disks, each slitting disk having relatively broad and outwardly projecting meat slitting blades disposed in spaced relation at and around its periphery and each feeding disk having in spaced relation at and around its periphery meat feeding blades provided with pointed ends for penetrating and feeding the meat upon rotation of the shafts.

References Cited in the file of this patent

UNITED STATES PATENTS

| | | |
|---|---|---|
| 589,477 | Maisonville | Sept. 7, 1897 |
| 2,025,505 | Gonser | Dec. 24, 1935 |
| 2,302,398 | Spang | Nov. 17, 1942 |
| 2,360,729 | Spang | Oct. 17, 1944 |